(12) United States Patent
Goumas

(10) Patent No.: US 11,105,396 B2
(45) Date of Patent: Aug. 31, 2021

(54) PLANETARY GEARBOX

(71) Applicant: Rolls-Royce Deutschland Ltd & Co KG, Blankenfelde-Mahlow (DE)

(72) Inventor: Andreas Goumas, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 16/927,630

(22) Filed: Jul. 13, 2020

(65) Prior Publication Data

US 2021/0025477 A1    Jan. 28, 2021

(30) Foreign Application Priority Data

Jul. 25, 2019   (EP) .................................... 19188336

(51) Int. Cl.
| | | |
|---|---|---|
| *F16H 1/28* | (2006.01) | |
| *F02C 7/36* | (2006.01) | |
| *F16C 17/04* | (2006.01) | |
| *F16H 57/08* | (2006.01) | |

(52) U.S. Cl.
CPC ................ *F16H 1/28* (2013.01); *F02C 7/36* (2013.01); *F16C 17/04* (2013.01); *F16H 57/08* (2013.01); *F05D 2220/32* (2013.01); *F05D 2240/50* (2013.01); *F16C 2361/61* (2013.01); *F16H 2057/085* (2013.01)

(58) Field of Classification Search
CPC ...... F16H 1/28; F16H 57/08; F16H 2057/085; F02C 7/36; F16C 17/04; F16C 2361/61; F05D 2220/32; F05D 2240/50
See application file for complete search history.

(56) References Cited

U.S. PATENT DOCUMENTS

| | | |
|---|---|---|
| 5,102,379 A | 4/1992 | Pagluica et al. |
| 2015/0252889 A1* | 9/2015 | Feraud .................. F16H 57/082 475/159 |
| 2018/0051797 A1 | 2/2018 | Klein-Hitpass |
| 2019/0162294 A1* | 5/2019 | Nique ................... F16C 23/045 |

FOREIGN PATENT DOCUMENTS

| | | |
|---|---|---|
| FR | 3071024 A1 | 3/2019 |
| FR | 3071025 A1 | 3/2019 |
| WO | 2019053372 A1 | 3/2019 |
| WO | 2019053374 A1 | 3/2019 |

OTHER PUBLICATIONS

European Search Report dated Jan. 21, 2020 from counterpart European App No. 19188336.2.

* cited by examiner

*Primary Examiner* — Huan Le
(74) *Attorney, Agent, or Firm* — Timothy J. Klima; Shuttleworth & Ingersoll, PLC

(57) ABSTRACT

The invention regards a planetary gearbox which includes a sun gear, a plurality of planet gears which are driven by the sun gear, a ring gear, and a plurality of journal bearing pins. Each of the journal bearing pins is located in an inner bore of one of the planet gears, wherein the journal bearing pins each have a longitudinal axis which extends in the axial direction of the planetary gearbox. In each case a journal bearing pin and a planet gear form a journal bearing. It is provided that the journal bearing pin includes, along the length of the journal bearing, a stiffness which varies along the longitudinal axis of the pin.

19 Claims, 12 Drawing Sheets

PLANETARY GEARBOX

This application claims priority to European Patent Application EP19188336.2 filed Jul. 25, 2019, the entirety of which is incorporated by reference herein.

The present disclosure relates to a planetary gearbox, a journal bearing pin for such planetary gearbox and a gas turbine engine with such planetary gearbox.

It is known to provide, in a planetary gearbox, journal bearing pins that are located in a planet gear inner bore of the planetary gearbox and form a journal bearing with the planet gear. Due to deformations of the planet gear and the journal bearing pin the oil film thickness and pressure distribution along the axis of the journal bearing can vary substantially.

The problem underlying the present invention is to provide for a journal bearing in a planetary gearbox which provides for a more even oil film thickness and pressure distribution along the axis of the journal bearing.

This problem is solved by a planetary gearbox with features as disclosed herein. Further embodiments are also disclosed herein.

According to an aspect of the invention, a planetary gearbox is provided which comprises a sun gear, a plurality of planet gears, a ring gear and a plurality of journal bearing pins. The sun gear rotates about a rotational axis of the planetary gearbox and is driven by a sun shaft, wherein the rotational axis defines an axial direction of the planetary gearbox. The planet gears are driven by the sun gear. Each planet gear comprises an inner bore. The planet gears mesh with the ring gear. Each of the journal bearing pins is located in an inner bore of one of the planet gears, wherein the journal bearing pins each have a longitudinal axis which extends in the axial direction of the planetary gearbox. In each case a journal bearing pin and a planet gear form a journal bearing.

It is provided that the journal bearing pin comprises, along the length of the journal bearing, a stiffness which varies along the longitudinal axis of the pin.

Aspects of the invention are thus based on the idea to provide for a journal bearing pin the stiffness of which is not fixed but varies along the longitudinal axis of the pin. This is associated with the advantage that the radial deformation that the pin experiences along its longitudinal axis during operation of the planetary gearbox can be matched with the radial deformation that the inner bore of the planet gear experiences during operation. This allows to optimize the oil film thickness and the oil pressure distribution along the longitudinal axis of the journal bearing formed by the journal bearing pin and the planet gear. The performance of the journal bearing pin is improved.

In this respect, it is pointed out that a planet gear of a planetary gearbox naturally deforms during operation under a centrifugal load and a torque acting on the planet gear. The journal bearing pin is located in the inner bore of the respective planet gear. By the deformation of the planet gear under load, the inner bore is also deformed, providing for an uneven distribution of the oil film thickness and a non-uniform journal bearing oil pressure distribution. By providing a journal bearing pin that has a stiffness which varies along the longitudinal axis of the pin, the pin can adapt its stiffness to eliminate or partially eliminate the negative effects of the radial deformation of the planet gear. To this end, stiffness is added at some axial positions and/or removed at other axial positions. The choice of where to add or subtract stiffness is dependent on the gearbox design, the planet gear design and the operating conditions.

When providing for a variation of the stiffness of the journal bearing pin, typically the radial stiffness (also referred to as bending stiffness) is varied. However, other aspects of the stiffness of the pin such as the rotational stiffness may also change.

It is pointed out that the present invention considers a variation of the stiffness of the journal bearing pin in the axial area of the journal bearing pin which forms, together with the respective planet gear, the journal bearing. Areas of the journal bearing pin which extend from such axial area and are mounted to a front carrier plate and a rear carrier plate are not considered as to their stiffness. When using the language that the journal bearing pin has two ends, as ends of the journal bearing pin are considered those axial positions of the pin which correspond with the axial ends of the journal bearing, typically just next to those parts of the pin that are mounted in a front carrier plate and rear carrier plate, respectively.

According to an aspect of the invention, the stiffness of the pin varies along the longitudinal axis of the pin such that the stiffness of the pin is reduced in axial areas in which the radial deflection of the planet gear is maximal during operation. A strong radial deflection of the planet gear in particular axial areas of the planet gear is thus combined with and met by a reduced stiffness (and thus an increased flexibility) in the respective axial areas of the journal bearing pin. This allows the planet gear and the journal bearing pin to deform in the same manner in the respective axial areas, thereby providing for a more robust oil film thickness and pressure distribution.

To realize such variation of the stiffness of the pin, first the radial deflection of the planet gear in which the journal bearing pin is to be mounted is to be measured. After having determined the axial areas of the planet gear in which the radial deflection is particularly high, the respective axial areas of the journal bearing pin are reduced in stiffness in one of the manners that will be discussed further below. Optimization methods may be used in this respect.

According to an aspect of the invention, the stiffness of the pin varies along the longitudinal axis of the pin such that the oil film thickness of the oil film in the journal bearing formed by the journal bearing pin and the respective planet gear is essentially constant. This provides for a uniform lubrication of the journal bearing and avoids metal-to-metal clashing between the pin and the planet gear. The oil film thickness of the oil film in the journal bearing is considered essentially constant if the difference between the maximum oil film thickness and the minimum oil film thickness along the length of the journal bearing is less than 50 percent, in particular less than 35 percent of the maximum oil film thickness. Optimization methods may be used to modulate the stiffness of the pin such that the oil film thickness is essentially constant. However, in principle, a trial and error approach could be implemented.

According to a further aspect of the invention, the stiffness of the pin varies along the longitudinal axis of the pin such that the oil film pressure of the oil film in the journal bearing formed by the journal bearing pin and the respective planet gear has one maximum only between the ends of the journal bearing pin. If the journal bearing had a uniform stiffness along its longitudinal length, the planet gear would have two local maxima of the oil film pressure along the longitudinal axis of the pin at least with some planet gear designs. By varying the stiffness of the pin a single maximum of the oil film pressure can be achieved, therefore providing for a more uniform distribution of the oil film pressure.

According to a further aspect of the invention, the journal bearing pin comprises a stiffness which additionally varies in the circumferential direction of the pin. Such variation in the circumferential direction is realized at at least one axial position of the pin and may be realized along the complete length of the pin. According to this embodiment, stiffness is added at some circumferential positions and/or removed at other circumferential positions. This embodiment is associated with the advantage that deformations that the pin experiences during operation of the planetary gearbox can be better matched with the deformation that the inner bore of the planet gear experiences during operation. This allows to optimize the oil film thickness and the oil pressure distribution both along the longitudinal axis and in the circumferential direction of the journal bearing formed by the journal bearing pin and the planet gear.

If the stiffness of the journal bearing pin varies in the circumferential direction, in embodiments, the stiffness is reduced in circumferential areas in which the deflection of the planet gear is maximal during operation. This allows the planet gear and the journal bearing pin to deform in the same manner in the respective circumferential areas.

The journal bearing pin typically comprises a wall and an inner bore extending along the longitudinal axis of the journal bearing pin. However, in principle, the journal bearing pin could be solid without an inner bore.

According to an exemplary embodiment, the stiffness of the journal bearing pin varies along the longitudinal axis in that the wall thickness of the pin varies along the longitudinal axis. This implies that the second moment of area of the pin (also referred to as area moment of inertia) varies along the longitudinal axis. In particular, the planar second moment of area varies. The variation of the wall thickness corresponds to a variation and change in the cross-sectional area of the wall, this leading to a change in the second moment of inertia.

In an embodiment, the wall thickness is modulated by the inner bore geometry, wherein the cross-sectional area of the journal bearing pin varies along the longitudinal axis of the pin dependent on the inner bore geometry. Accordingly, a variation in the wall thickness is realized by changing and modulating the contour of the inner bore of the journal bearing pin.

According to an aspect of the invention, the modulation of the inner bore geometry is provided by cutouts located in the inner surface of the wall, wherein the inner radius of the pin is increased in the cutouts. In the area of a cutout, the wall thickness is decreased and, accordingly, the cross-sectional area of the pin is reduced. The cutouts may extend 360° in the circumferential direction and, accordingly, may be in the form of a full ring. However, in other embodiments, the cutouts extend less than 360° in the circumferential direction, in particular less than 180° in the circumferential direction. In particular, if there is a particular circumferential angular range of the pin in which the film pressure is high, it may be provided that the cutouts extend in the circumferential direction in such circumferential angular range. In such embodiment, the stiffness of the pin also varies in the circumferential direction of the pin.

In an exemplary embodiment, several cutouts with different depths are provided in the inner surface of the wall along the longitudinal axis of the pin. In a further exemplary embodiment, at least one cutout is located between the middle and the forward end of the pin and at least one cutout is located between the middle and the rearward end of the pin. Accordingly, in an embodiment, there are provided two cutouts, each of the cutouts located in the axial direction between the middle and an end of the pin.

The cutouts may be arranged symmetrically with respect to the middle of the pin, the middle of the pin being defined as the half axial distance between the ends of the pin. However, depending on the gearbox design, the planet gear design and operating conditions the cutouts may be arranged asymmetrically with respect to the middle of the pin.

In an embodiment, the cutouts are rectangular and form a rectangular step in the inner surface of the wall. Accordingly, there is an abrupt change in wall thickness in a cutout compared to the surrounding wall areas. In other embodiments, the wall thickness may change gradually and not abruptly.

According to a further embodiment, the journal bearing pin comprises at least one stiffening rib that extends between circumferentially opposite (180°) wall sections of the pin. The rib may extend cross to the longitudinal direction of the pin. It may have the form of a rod or of several rods that cross each other (such as the spokes of a wheel). Alternatively, the rib may form a wall extending cross to the longitudinal direction of the pin and completely closing the inner bore of the pin.

It may be provided that the rib extends in the central or middle area of the pin. However, it is not necessarily the case that the rib extends exactly at the middle of the rib. It may deviate from the exact middle position towards one or the other end of the pin.

In other embodiments, the rib extends in the longitudinal direction of the pin, providing additional stiffness along the complete length of the pin. The stiffness may then be modulated by cutouts formed along the length of the pin.

In an embodiment, the journal bearing pin comprises two cutouts and a rib, wherein the rib is located in the axial direction between the two cutouts. In such embodiments, the radial stiffness has a maximum in a middle region of the pin and is reduced between the middle region and the ends of the pin.

According to a further embodiment, at least one stiffening ring is provided in the inner surface of the wall, wherein the inner radius of the pin is decreased in the area of the stiffening ring. This embodiment provides for an added stiffness by means of an increased wall thickness in at least one axial area of the pin. The stiffening ring may extend 360° in the circumferential direction, in such case forming a circumferential ring. Alternatively, the stiffening ring may extend less than 360° in the circumferential direction, wherein the stiffness of the pin also varies in the circumferential direction of the pin.

In an embodiment, the stiffness of the pin has a maximum in a central area of the pin and two minima in areas that are located between the central area and the ends of the pin, wherein the respective minimum is not at the end but at a distance to the end of the pin.

Generally, in embodiments of the invention, a variation of the stiffness of the journal bearing pin along the longitudinal axis of the pin (and, in embodiments, also in the circumferential direction of the pin) is provided for by implementing cutouts and/or stiffening ribs and/or stiffening rings.

In a further aspect of the invention, the stiffness of the journal bearing pin is modulated by the material properties of the pin that define its stiffness, in particular its elasticity. Such modulation by material properties may be in addition to a modulation of the stiffness by geometrical properties. The elasticity of the material may be measured by the Young modulus which is a mechanical property that measures the stiffness of a solid material known to the skilled person.

In an embodiment, the pin is made out of a composite material, wherein the elasticity of the material varies infinitely along the longitudinal axis of the pin. In particular, the proportions of the materials that form the composite material may vary along the longitudinal length, thereby changing the elasticity. In another embodiment, the pin is made of different materials that are assembled together, wherein the different materials have a different elasticity. For example, the pin may have a ceramic section bonded to a metallic section.

In a further aspect, the present invention provides for a journal bearing pin which is configured to form, together with a planet gear of a planetary gearbox, a journal bearing. It is provided that the journal bearing pin comprises, along the length of the journal bearing, a stiffness which varies along the longitudinal axis of the pin. The further embodiments disclosed herein also apply to such journal bearing pin.

In a further aspect, the present invention provides for a gas turbine engine for an aircraft. The gas turbine engine comprises an engine core that comprises a turbine, a compressor and a core shaft connecting the turbine to the compressor. The gas turbine engine further comprises a fan located upstream of the engine core, the fan comprising a plurality of fan blades. A planetary gearbox in accordance with the present disclosure is provided that receives an input from the core shaft and outputs drive to the fan so as to drive the fan at a lower rotational speed than the core shaft.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine in which the present invention is implemented, with the axial direction pointing from the engine inlet to the engine outlet. The axial direction of the planetary gearbox is identical to the axial direction of the gas turbine engine. Starting from the x-axis, the radial direction points radially outwards. Terms such as "in front of" and "behind" refer to the axial direction or flow direction in the engine. Terms such as "outer" or "inner" refer to the radial direction.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The invention will be explained in more detail on the basis of exemplary embodiments with reference to the accompanying drawings in which.

Figure 22:
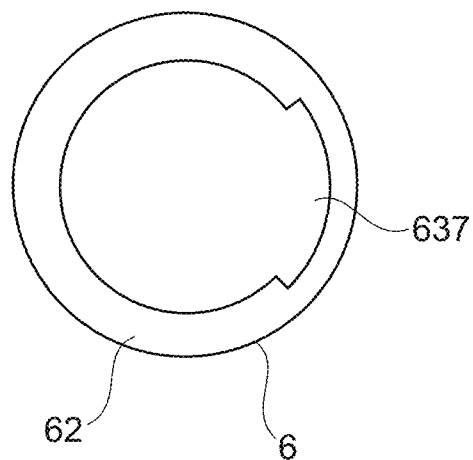
Figure 23:
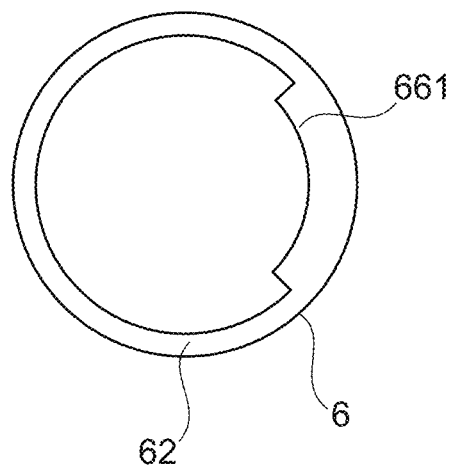

FIG. 22 is a cross-sectional view of an embodiment of a journal bearing pin which comprises a stiffness which varies along the longitudinal axis of the pin, wherein a cutout provided in the wall of the pin extends only partially in the circumferential direction; and FIG. 23 is a cross-sectional view of a further embodiment of a journal bearing pin which comprises a stiffness which varies along the longitudinal axis of the pin, wherein a stiffening ring provided at the inner surface of the wall of the pin extends only partially in the circumferential direction.

Figure 1:
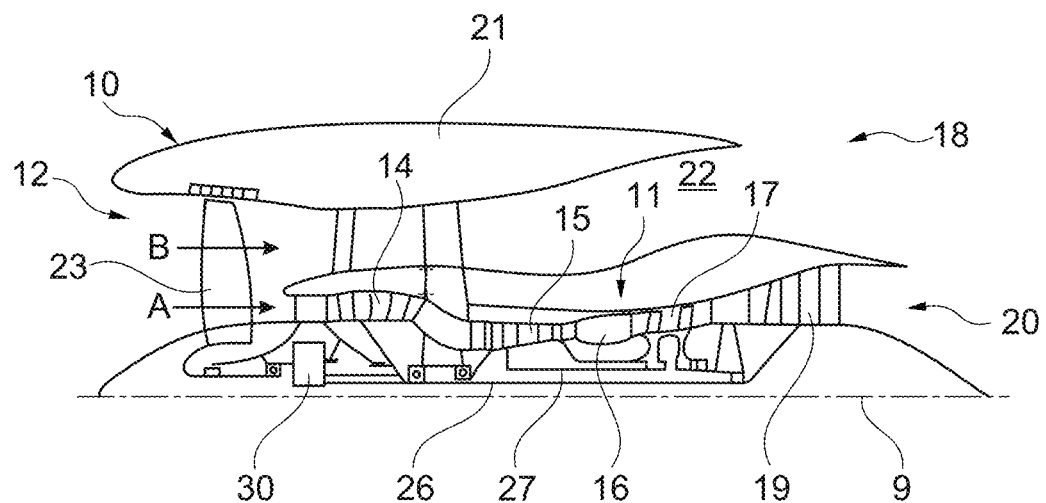
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
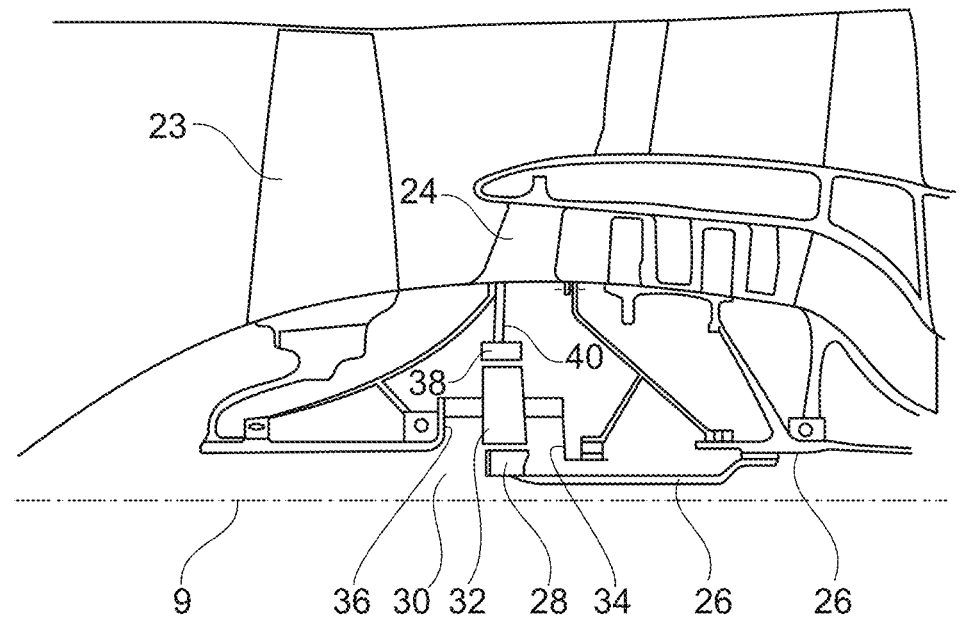
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
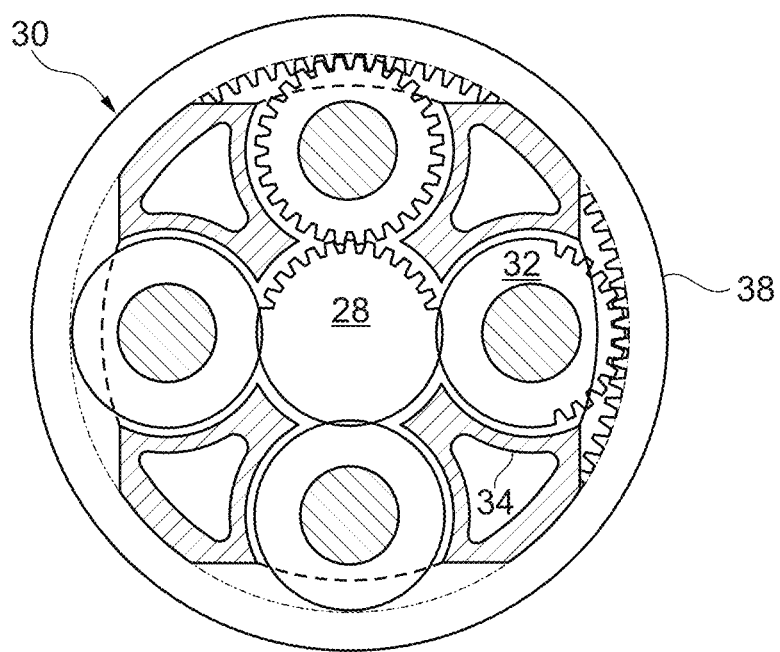
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
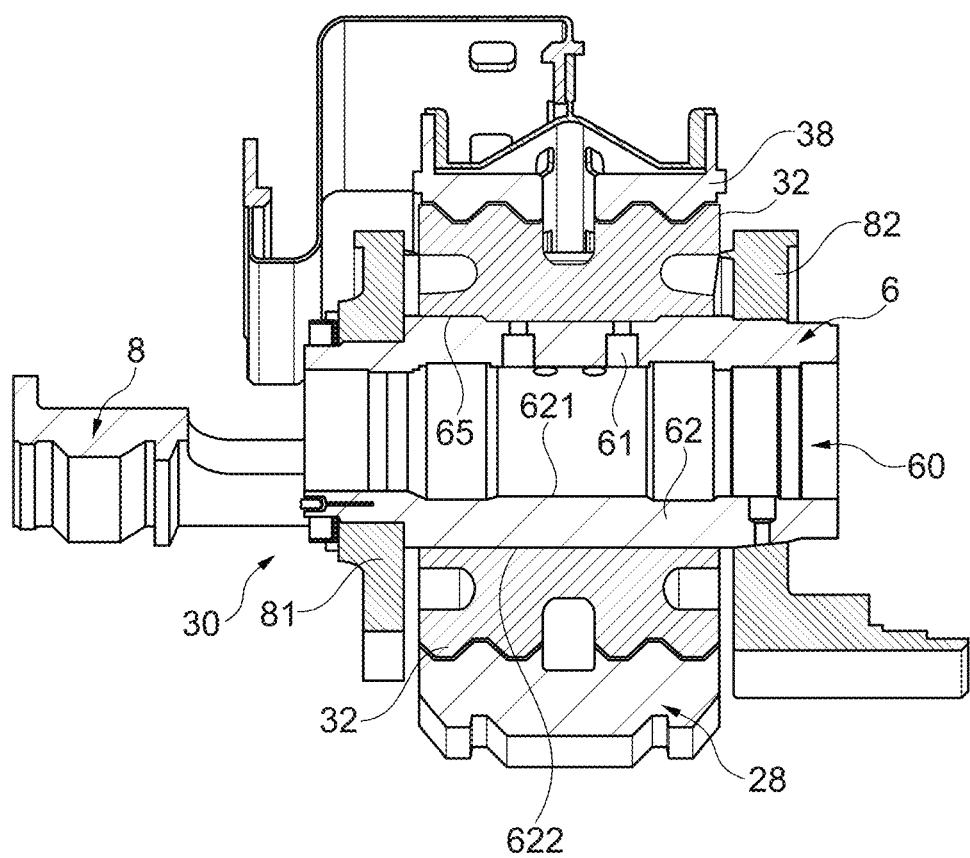
FIG. 4 is a sectional view of an example of a planetary gearbox in which a journal bearing pin and a planet gear form a journal bearing.

FIG. 4 shows an example of a planetary gearbox 30 of a gas turbine engine in a sectional view. The planetary gearbox 30 comprises a sun gear 28 which is driven by a sun shaft or drive shaft (not shown). The drive shaft is the shaft 26 of FIGS. 1 and 2 or generally a turbine shaft. The sun gear 28 and the drive shaft rotate about the axis of rotation 9 (see FIG. 1). The axis of rotation of the planetary gearbox 30 is identical to the axis of rotation of the gas turbine engine.

The planetary gearbox 30 includes a plurality of planet gears 32, one of which is shown in the sectional view of FIG. 4. The sun gear 28 drives the planet gear 32, whereby a toothing of the sun gear 28 meshes with a toothing of the planet gear 32.

The planet gear 32 is hollow cylindrical and forms an outer surface and an inner surface. The planet gear 32 rotates—driven by the sun gear 28—around an axis of rotation which runs parallel to the axis of rotation of the planetary gearbox. The outer circumferential surface of the planet gear 32 forms a toothing which meshes with the toothing of a ring gear 38. The ring gear 38 is fixed, i.e. non-rotating. In other embodiments, the ring gear may be rotating, while the planet gears are fixed in their position in the gearbox. The planet gears 32 rotate due to their coupling with the sun gear 28 and travel along the circumference of the ring gear 38. The rotation of the planet wheels 32 along the circumference of the ring gear 38 and around the axis of rotation 90 is slower than the rotation of the drive shaft, providing a reduction ratio.

The planet gear 32 has a central axial opening or bore adjacent to its inner circumferential surface. A journal bearing pin 6 is inserted into the opening, which itself also has an axial bore 60, whereby the journal bearing pin 6 and the planetary gear 32 form a journal bearing 65 on their facing surfaces. The journal bearing pin 6 forms a wall 62 which has an inner surface 621 and an outer surface 622, the inner surface 621 defining the axial bore 60 and the outer surface 622 forming part of the journal bearing 65. The journal bearing pin 6 will be referred to as "pin" as well in the following.

FIG. 4 also shows a front carrier plate 81 and a rear carrier plate 82. The journal bearing pin 6 is fixedly attached to the front carrier plate 81 and to the rear carrier plate 82, for example screwed or welded to them. The front carrier plate 81 is connected to a torque carrier 8 which is coupled to the fan shaft.

To lubricate the bearing 65 between the journal bearing pin 6 and planet gear 32, an oil supply device is provided which comprises an oil supply channel (not shown) through which oil from a circulating oil system is fed into lubrication film openings 61 in journal bearing pin 6.

In the context of the present invention the construction of the journal bearing pin 6 is of relevance. The pin shown in sectional view in FIG. 4 is shown in a perspective view in FIG. 5. In the context of the present invention, when referring to the journal bearing pin 6, the part of the pin 6 extending between the front carrier plate 81 and the rear carrier plate 82 and defining the journal bearing is considered only. The extensions 6a, 6b of the pin 6 shown in FIG. 5 that are located in the carrier plates 81, 82 are not considered.

Figure 5:
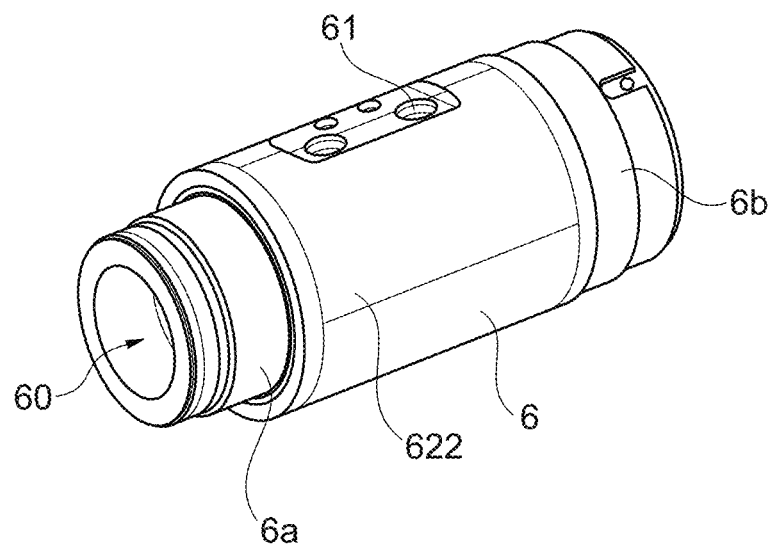
FIG. 5 is a three-dimensional view of a nominal journal bearing pin.

The pin 6 of FIGS. 4 and 5 has been outer surface 622 which is cylindrical in the relevant area between the carrier plates 81, 82. The inner surface 621 of the pin 6 is also cylindrical. Accordingly, the stiffness of the pin, in particular its bending stiffness or radial stiffness is constant and does not depend on the axial position of the pin. The pin 6 of FIGS. 4 and 5 is not in accordance with the present invention.

The journal bearing pin 6 reacts the centrifugal load from the planet gear 32 and the torque from the carrier 8. In addition, it provides lubrication such that no metal-to-metal clashing exists between the pin 6 and the planet gear 32. Aspects of the present invention are based on the realization that the stiffness of the pin is crucial because it directly affects the oil film thickness and oil pressure of the journal bearing and may be varied along the longitudinal axis of the pin in order to optimize the oil film thickness and oil pressure of the journal bearing.

Figure 6:
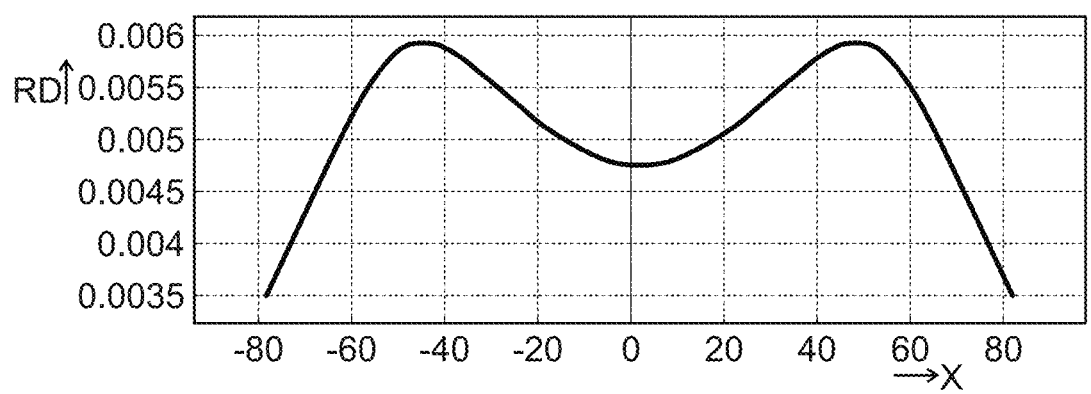
FIG. 6 shows the radial deflection of a planet gear of a planetary gearbox depending on the axial position.

To better understand the background of the present invention, the radial deformation of a planet gear is first considered. FIG. 6 shows in a diagram the radial deflection RD of a planet gear such as the planet gear 32 of FIG. 4 in dependence of the axial direction x of the planet gear. Generally, the axial direction is the longitudinal direction of the planet gear or journal bearing pin and identical or parallel to the axis of rotation 9 of the gas turbine engine in which the planetary gearbox is located according to embodiments. As shown in FIG. 6, the planet gear deflects radially outward during operation of the planetary gearbox in a double peak shape, having two maxima of radial deflection between the middle of the planet gear and the ends of the planet gear. This deformation is caused by the form of the planet gear and may vary depending on the shape of the planet gear.

FIG. 6 shows the radial deflection RD of a planet gear under consideration of a centrifugal load acting on the planet gear. Once a torque load is applied as well, the double peak deflected shape remains, wherein the center section may deflect more outwardly since the helixes of the planet gear (see FIG. 4) are constrained due to the meshing of forces of the planet gear. However, the principal form of the curve shown in FIG. 6 still applies. Accordingly, the planet gear and thus also the planet gear bore in which the journal bearing pin is located experiences a radial deformation which acts on the journal bearing pin 6 located inside the bore of the planet gear. This leads to a suboptimal performance of the journal bearing. This can be seen in the left-hand diagram of FIG. 11 which shows the oil from pressure of the oil film of the journal bearing in dependence of the axial direction x and in the left-hand diagram of FIG. 12 which shows the oil film thickness of the oil film of the journal bearing in dependence of the axial direction x. Both the oil film pressure and the oil film thickness vary, while, ideally, an uniform oil film thickness and pressure distribution is desired.

Figure 7:
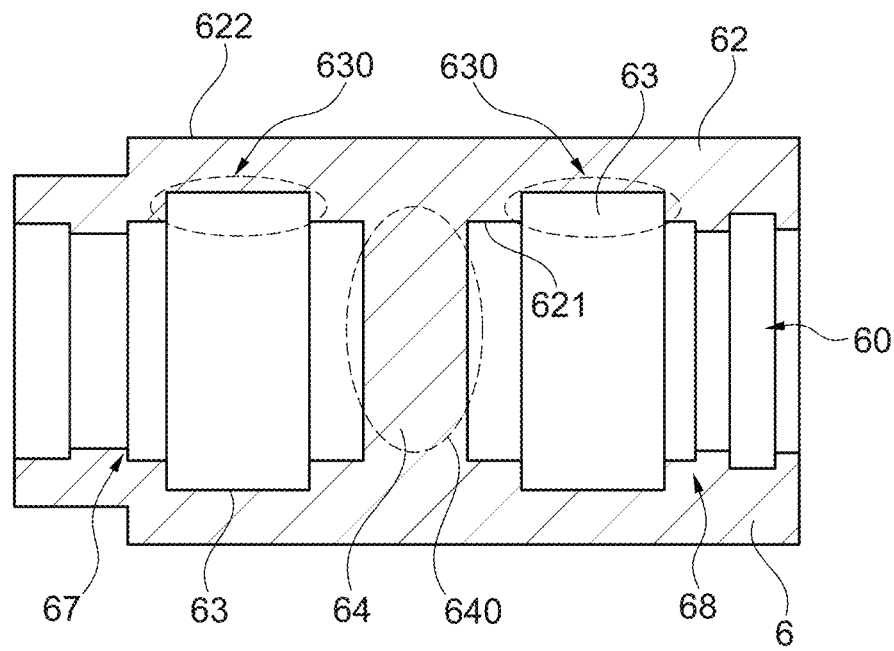
FIG. 7 is a first embodiment of a journal bearing pin which comprises a stiffness which varies along the longitudinal axis of the pin, wherein two cutouts and a stiffening wall are provided by the inner geometry of the pin.

FIG. 7 shows an embodiment of a journal bearing pin 6 which comprises a wall 62 the inner geometry or inner surface 621 of which is modulated. The outer surface 622 is cylindrical. The pin 6 comprises two cutouts 63 which are provided in the inner surface 621 of the wall 62. In the cutouts 63, the inner radius of the pin 6 is increased. Accordingly, the cross-sectional area of the pin 6 is reduced in the axial areas 630 in which the cutouts 63 are formed in the wall 62. Accordingly, the stiffness of the pin is reduced in the areas 630 of the cutouts 63, and also the second moment of area of the pin is reduced in these areas. Because of the reduced stiffness, the pin 6 is more flexible in the areas 630 in which the cutouts 63 are implemented.

The areas 630 of the cutouts 63 in which the stiffness of the pin 6 is reduced do not extend to the ends 67, 68 of the pin 6, but are located at a distance from the ends 67, 68 of the pin 6 (the ends 67, 68 of the pin referring to the part of the pin forming the journal bearing as discussed above). Accordingly, starting from one end 67 and going in the axial direction, the stiffness is first reduced in first area 630, then increased in area 640 (and being there higher than at ends 67, 68), then decreased in second area 630 and increased again towards the other end 68.

Further, in the central area of the pin 6, a rib 64 is provided which reinforces the stability of the pin 6 in the central area 640 and, accordingly, increases the stiffness of the pin in this area. The rib 64 may have the form of a rod extending between circumferentially opposite wall sections of the pin, such that the bore 60 of the pin 6 is not completely closed by the rib 64. Alternatively, the rib 64 may form a wall fully closing the bore 60 of the pin.

The pin design of FIG. 7 having two cutouts 63 and one reinforcing rib 64 provides for a variation of the stiffness of the pin 6 along the longitudinal axis of the pin 6, wherein the stiffness is increased at the axial position of the rib 64 and is decreased at the axial positions of the cutouts 63.

It is pointed out that in the embodiment of FIG. 7 there is an abrupt change of radius in the area of a cutout 63, i.e., the wall thickness is abruptly reduced. In a longitudinal sectional view of the pin, the inner surface 621 of the pin forms a rectangle curve. However, in other embodiments, the wall thickness may vary continually.

Further, it is pointed out that in the embodiment of FIG. 7 the reinforcing rib 64 is not necessarily arranged exactly in the middle of the pin. Generally, the inner geometry of the pin does not have to be symmetrical, but may be symmetrical. However, the reinforcing rib 64 is located between the two cutouts 63. In an embodiment, the axial distance between the rib 64 and each of the cutouts 63 is the same.

Figure 8:
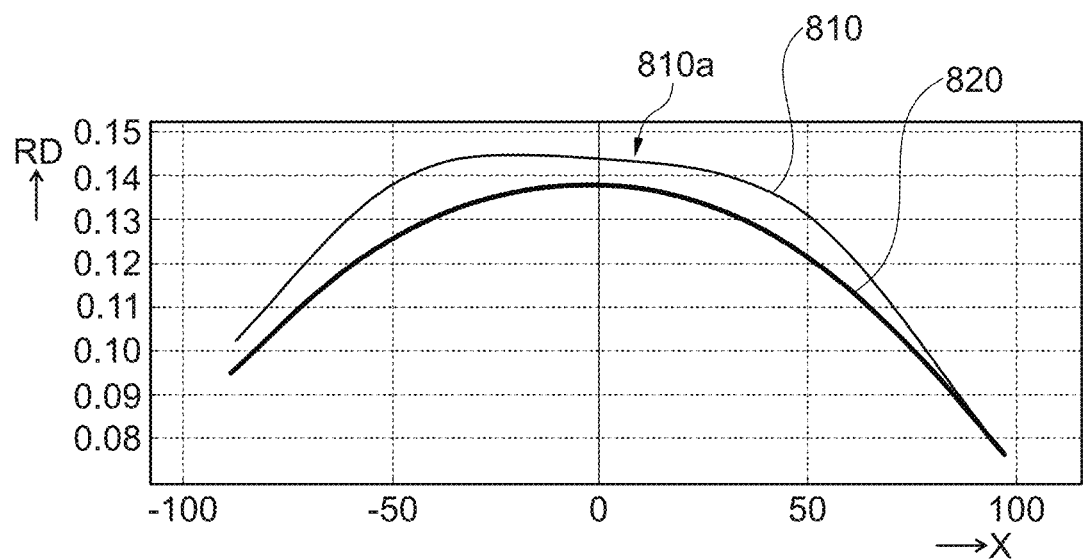
FIG. 8 shows the radial deflection of a journal bearing pin depending on the axial position both for a journal bearing pin in accordance with FIG. 7 and for a nominal journal bearing pin in accordance with FIG. 5.

FIG. 8 shows the radial deflection RD of the journal bearing pin 6 of FIG. 7 in dependence of the axial direction x, and in comparison to the radial deflection of a nominal pin as shown in FIGS. 4 and 5. By the variation of the pin stiffness the curve 810 for the pin of FIG. 7 shows an increased radial deflection compared to the curve 820 of the nominal pin. Also, the radial deflection in curve 810 forms a plateau 810a in which the radial deflection is relatively constant.

Figure 9:
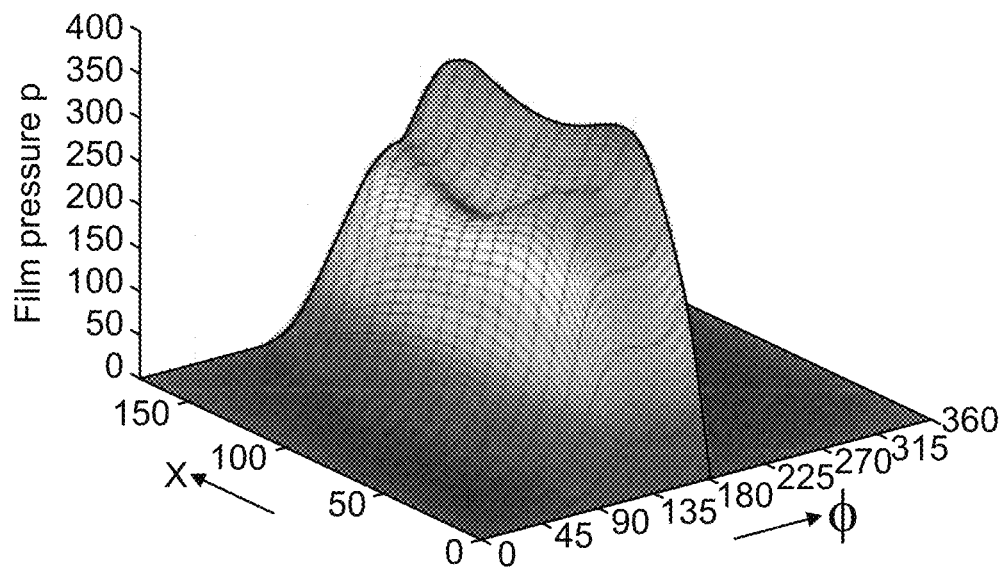
FIG. 9 is a three-dimensional diagram showing for a nominal journal bearing pin in accordance with FIG. 5 the film pressure of the oil film in the journal bearing depending on the circumferential position and depending on the axial position.
Figure 10:
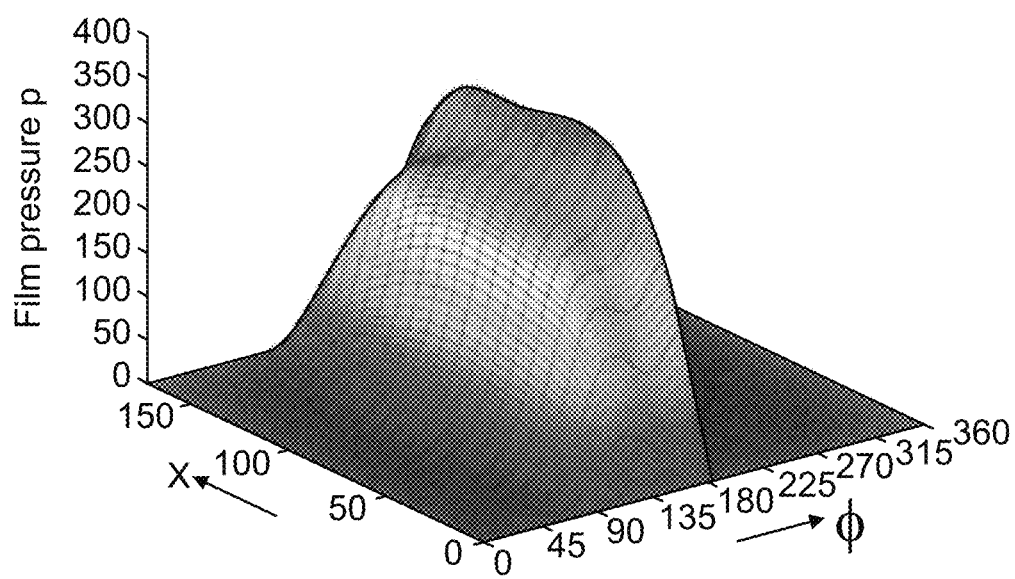
FIG. 10 is a three-dimensional diagram showing for a journal bearing pin in accordance with FIG. 7 the film pressure of the oil film in the journal bearing depending on the circumferential position and depending on the axial position.

The effects of such pin stiffness variation on the oil film pressure and the oil thickness of the journal bearing are shown and discussed with respect to FIGS. 9 to 12. FIG. 9 shows the film pressure p in dependence of the circumferential direction ϕ and in the axial direction x for the nominal pin. There is a double peak both in the circumferential direction ϕ and in the axial direction x which is disadvantages as it provides for a non-uniform film pressure. FIG. 10 shows the film pressure p in dependence of the circumferential direction ϕ and in the axial direction x for the pin of FIG. 7. It can be seen that the double peak has disappeared or is considerably smaller both in the circumferential direction ϕ and in the axial direction x.

Further, it can be seen from FIGS. 9 and 10 that the film pressure is close to zero in the circumferential range between about 210° and 90°, and that a film pressure is present in the circumferential range between about 90° and 210°.

Figure 11:
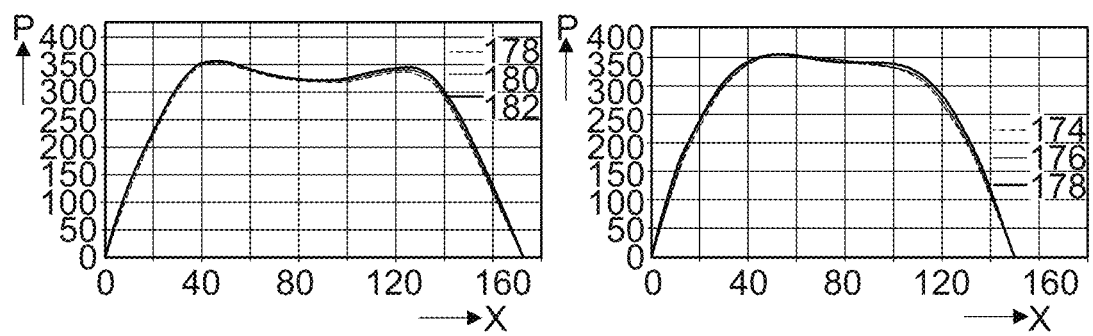
FIG. 11 is a two-dimensional diagram showing both for a nominal journal bearing pin and for a journal bearing pin in accordance with FIG. 7 the oil film pressure depending on the axial position.

FIG. 11 shows on the left-hand side the oil film pressure p of a nominal pin in dependence of the axial direction x for three different circumferential angles of 178°, 180° and 182°. FIG. 11 shows on the right-hand side for the pin of FIG. 7 the oil film pressure p in dependence of the axial direction x for three different circumferential angles of 174°, 176° and 178°. The left-hand diagram of FIG. 11 is thus a sectional view of the 3D diagram of FIG. 9 and the right-hand diagram of FIG. 11 is a sectional view of the 3D diagram of FIG. 10. By means of the variation of the stiffness of the pin, the double peak shape of the oil film pressure of the nominal pin is avoided and one maximum only of the oil film pressure is realized with the pin with varied stiffness.

Figure 12:
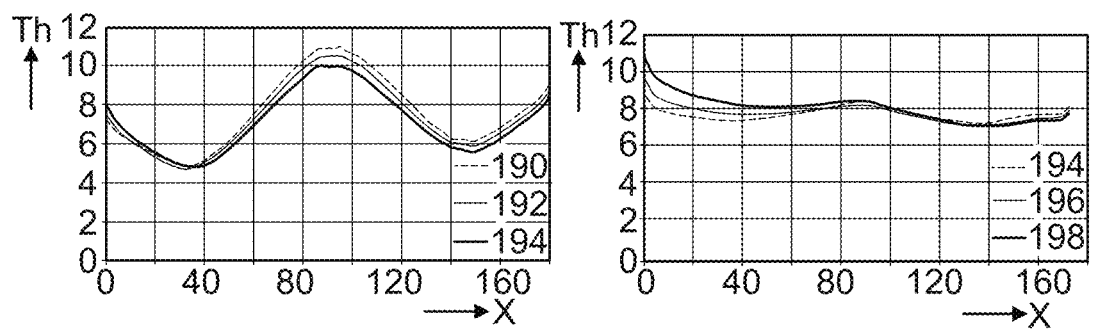
FIG. 12 is a two-dimensional diagram showing both for a nominal journal bearing pin and for a journal bearing pin in accordance with FIG. 7 the oil film thickness in the journal bearing depending on the axial position.

FIG. 12 shows on the left-hand side the oil film thickness Th of a nominal pin in dependence of the axial direction x for three different circumferential angles of 190°, 192° and 194°. FIG. 12 shows on the right-hand side for the pin of FIG. 7 the oil film thickness Th in dependence of the axial direction x for three different circumferential angles of 194°, 196° and 198°. By means of the variation of the stiffness of the pin, the variation of the film thickness is highly reduced and the film thickness essentially constant over the complete length of the pin.

By variation of the stiffness of the pin, accordingly, a more robust oil film thickness and pressure distribution is achieved along the axis of the journal bearing. This can be explained by the fact that, by reducing the stiffness and thus increasing the flexibility of the pin in axial areas in which the radial deflection of the planet gear is high, a more uniform deflection of the planet gear and the pin is achieved. The same is true when increasing the stiffness and thus reducing the flexibility of the pin in axial areas in which the radial deflection of the planet gear is low.

FIGS. 13 to 23 show further embodiments of journal bearing pins which have a radial stiffness that varies along the longitudinal axis of the pin.

Figure 13:
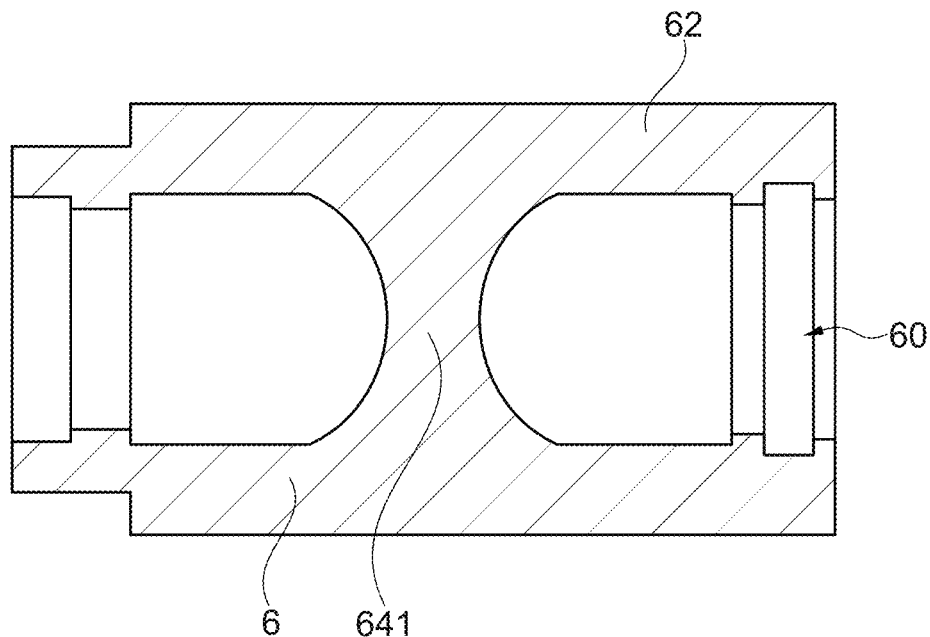
FIG. 13 is a further embodiment of a journal bearing pin which comprises a stiffness which varies along the longitudinal axis of the pin, wherein a stiffening wall is provided by the inner geometry of the pin.

In the embodiment of FIG. 13, a stiffening rib 641 is added in the middle region of the pin 6. This allows to tune the radial stiffness of the pin to compensate for a non-uniform inner bore deformation of a planet gear. Cutouts are not provided in the wall 62 of the pin in this embodiment.

Figure 14:
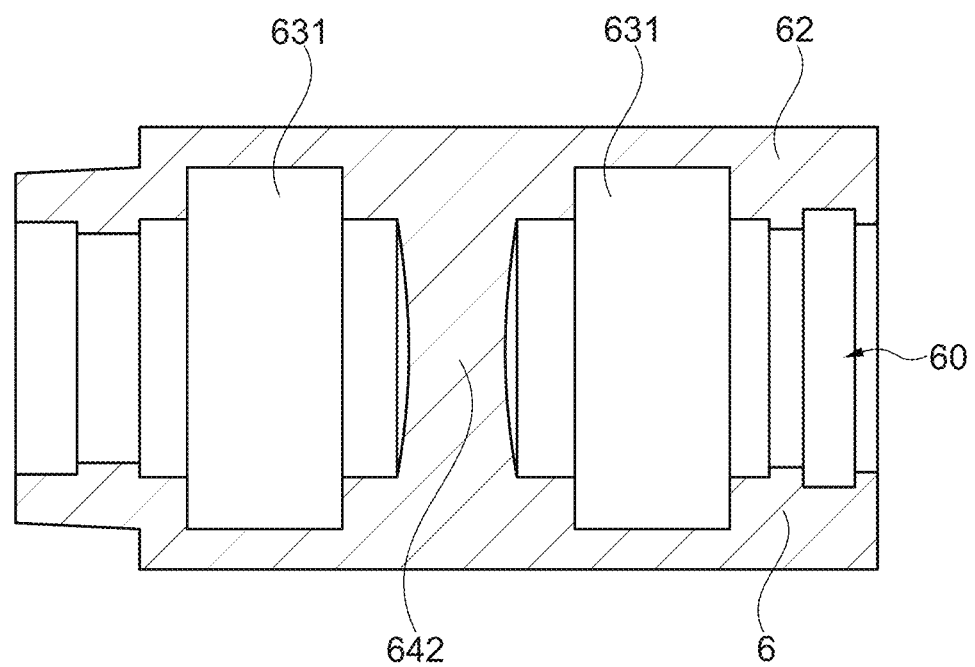
FIG. 14 is a further embodiment of a journal bearing pin which comprises a stiffness which varies along the longitudinal axis of the pin, wherein two cutouts and a stiffening wall are provided by the inner geometry of the pin.

In the embodiment of FIG. 14, two cutouts 631 and one stiffening rib 642 are provided similar to the embodiment of FIG. 7. However, the cutouts 631 are deeper than the cutouts 63 of the embodiment of FIG. 7.

Figure 15:
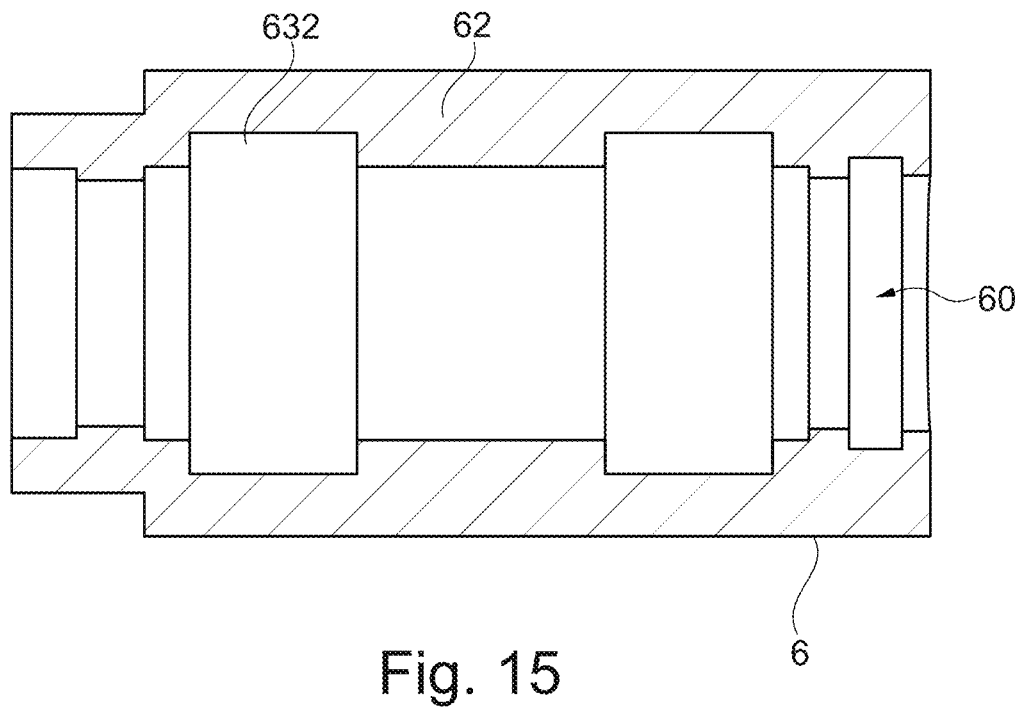
FIG. 15 is a further embodiment of a journal bearing pin which comprises a stiffness which varies along the longitudinal axis of the pin, wherein two cutouts are provided by the inner geometry of the pin.

In the embodiment of FIG. 15, two circumferential cutouts 632 are provided in the wall 62 of the pin 6. A reinforcing rib is not provided for in this embodiment. The cutouts 632 are at a distance to each other and both between the middle and one side of the pin.

Figure 16:
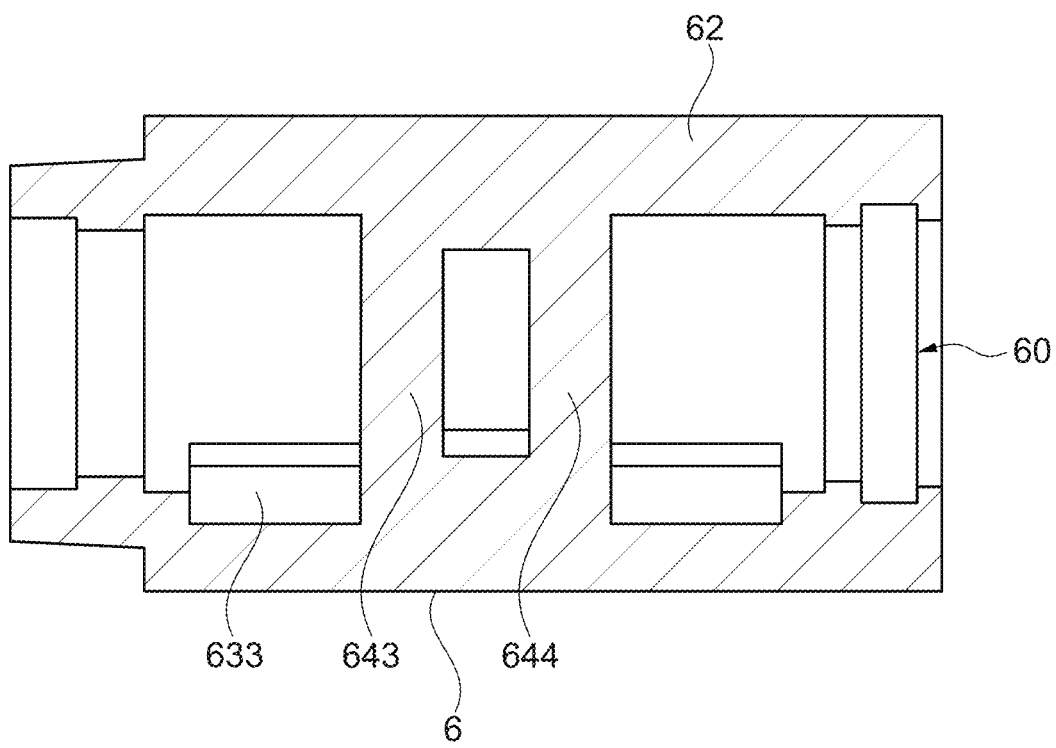
FIG. 16 is a further embodiment of a journal bearing pin which comprises a stiffness which varies along the longitudinal axis of the pin, wherein two stiffening walls are provided by the inner geometry of the pin.
Figure 17:
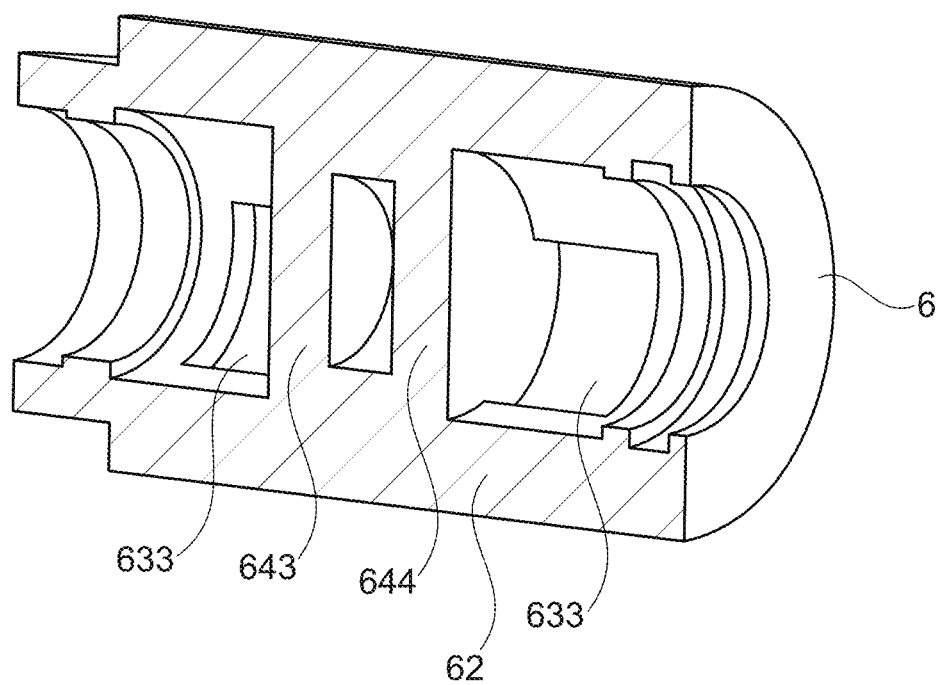
FIG. 17 is perspective sectional view of the embodiment of FIG. 16.

FIGS. 16 and 17 show an embodiment which comprises two reinforcing ribs 643, 644 that form complete walls and are located at an axial distance to each other in the middle area of the pin 6. The pin 6 further comprises two cutouts 633 which, different than the cutouts previously shown, do not extend 360° degrees in the circumferential direction, but extend less than 360° in the circumferential direction. For example, they may extend for an angular range only that corresponds to the angular range shown in FIG. 10 in which there is a pressure build up. In examples, the cutouts 633 extend in circumferential range between 90° and 210° or between 130° and 210°. In this embodiment, the stiffness of the pin 6 also varies in the circumferential direction of the pin.

Figure 18:
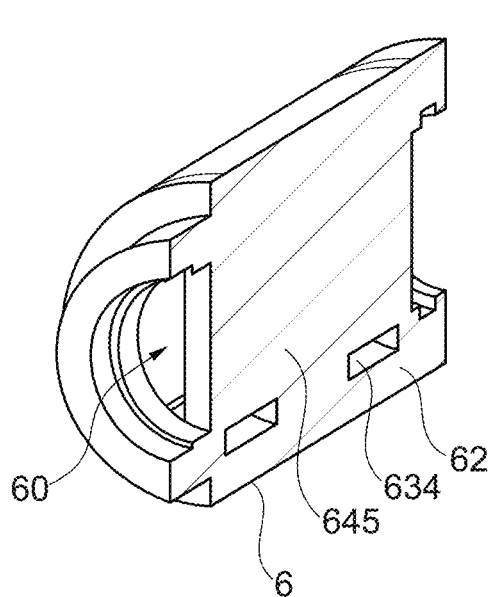
FIG. 18 shows a further embodiment of a journal bearing pin which comprises a stiffness which varies along the longitudinal axis of the pin, wherein a longitudinally extending wall is provided by the inner geometry of the pin.
Figure 19:
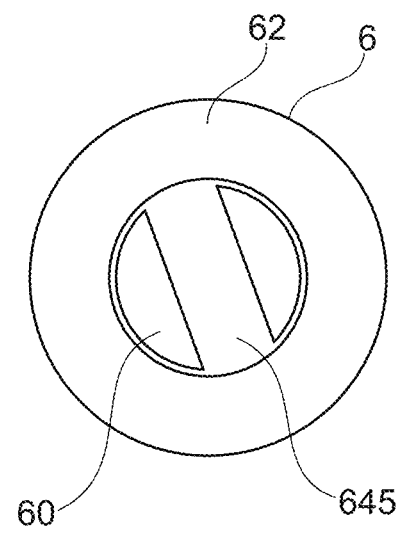
FIG. 19 is a cross-sectional view of the embodiment of FIG. 18.

FIGS. 18 and 19 show an embodiment in which the pin 6 comprises a wall or rib 645 which extends in the axial direction. Accordingly, the opening 60 in the pin is not completely closed. The provision of a longitudinal rib 645 generally increases the stiffness of the pin 6. To provide for a variation of the stiffness, two cutouts 634 are provided that, similar to the cutouts 633 of FIGS. 16 and 17, extend less than 360° in the circumferential direction.

Figure 20:
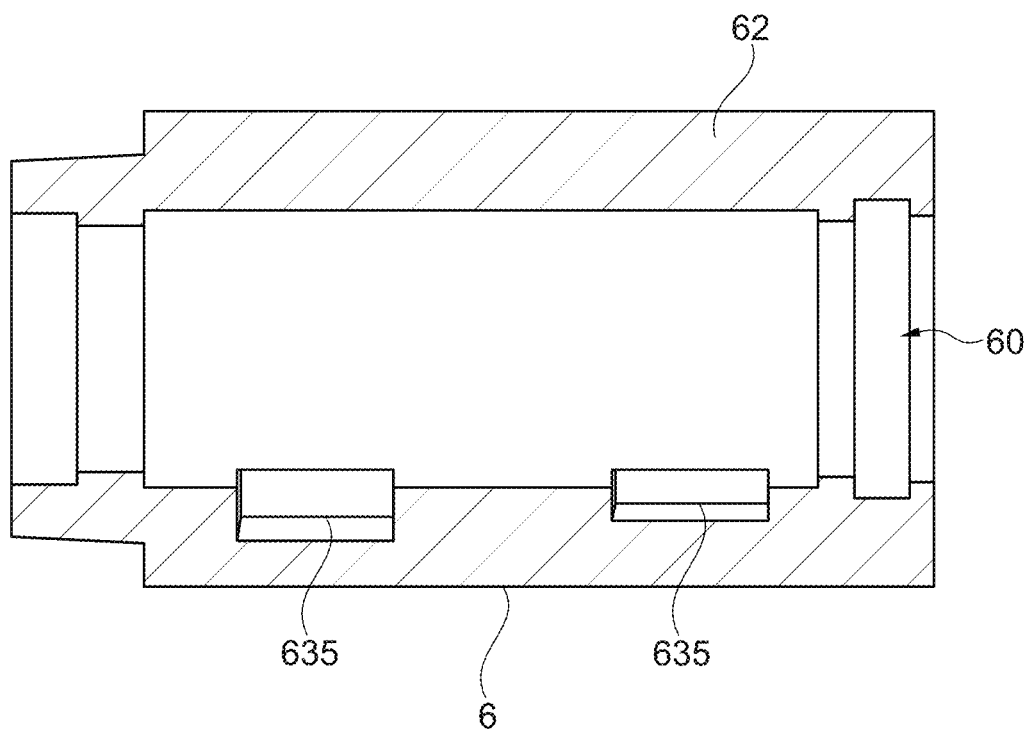
FIG. 20 is a further embodiment of a journal bearing pin which comprises a stiffness which varies along the longitudinal axis of the pin, wherein two cutouts extending only partially in the circumferential direction are provided by the inner geometry of the pin.

FIG. 20 shows an embodiment in which partial cutouts 635 which extend less than 360° in the circumferential direction are provided only. A stiffening rib is not provided for in this embodiment. Again, the partial cutouts 635 may extend about an angular range that corresponds to the angular range in which there is a pressure build up in the oil film, as shown in FIG. 10. In this embodiment, the stiffness of the pin 6 also varies in the circumferential direction of the pin.

Figure 21:
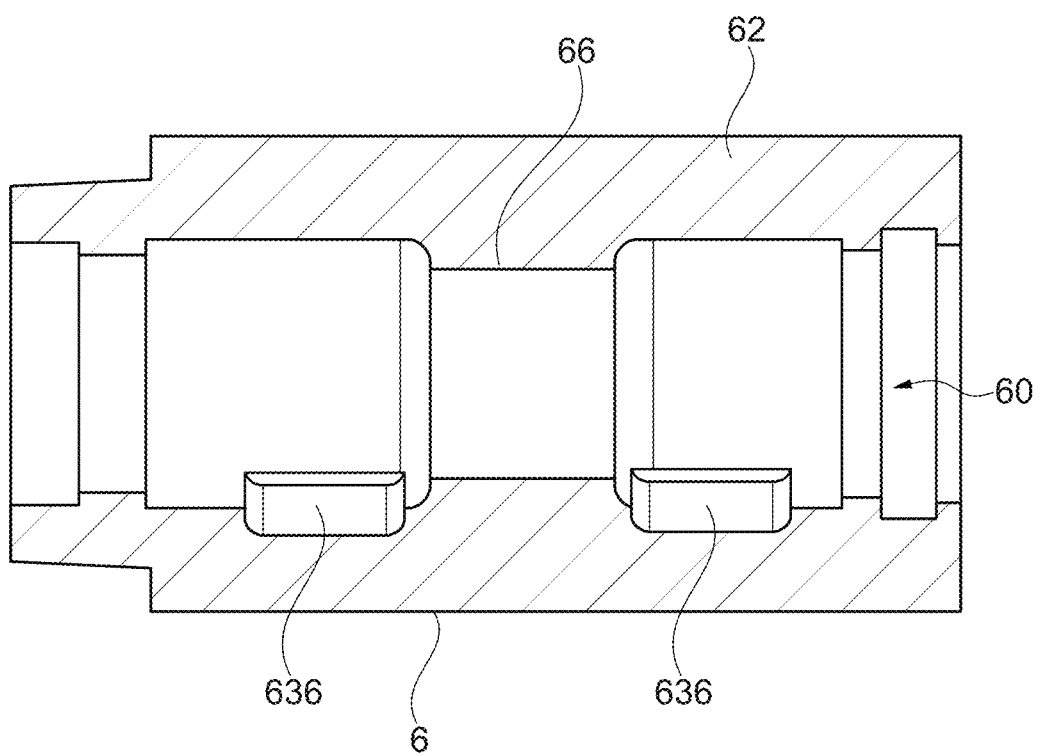
FIG. 21 is a further embodiment of a journal bearing pin which comprises a stiffness which varies along the longitudinal axis of the pin, wherein a stiffening ring is provided at the inner surface of the wall of the pin.

FIG. 21 shows a further embodiment of a pin 6 having a wall 62 with varying thickness. In the embodiment of FIG. 21, a stiffening ring 66 is provided for in the middle region of the pin. In the area of the stiffening ring 66, the thickness of the wall 62 is increased. To the right and to the left of the stiffening ring 62 partial cutouts 636 are provided in the wall, the partial cutouts extending less then 360° in the circumferential direction, similar as in the embodiments of FIGS. 18 to 20.

FIG. 22 is a cross-sectional view of a pin 6 which has a partial cutout 637 in the wall 62 of the pin 6.

FIG. 23 is a cross-sectional view of a pin 6 which has a partial stiffening ring 661 which is not a full circumferential ring but extends only about a particular circumferential angular range.

In the embodiments of FIGS. 21, 22, the stiffness of the pin 6 also varies in the circumferential direction of the pin.

The above described embodiments provide for a variation of the stiffness of the journal bearing pin along the longitudinal axis of the pin and, in some embodiments, also in the circumferential direction of the pin by implementing cutouts and/or stiffening ribs and/or stiffening rings. Various modifications may be provided for by combining various forms and numbers of cutouts and/or stiffening ribs and/or stiffening rings.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A planetary gearbox comprising:
a sun gear configured to rotate about a rotational axis of the planetary gearbox, the rotational axis defining an axial direction of the planetary gearbox,
a plurality of planet gears which are driven by the sun gear, each planet gear comprising an inner bore,
a ring gear, the planet gears meshing with the ring gear, and
a plurality of journal bearing pins, each of the journal bearing pins being located respectively in the inner bore of one of the planet gears, the journal bearing pins each having a longitudinal axis which extends in the axial direction of the planetary gearbox,
each of the respective journal bearing pins and planet gears forming a journal bearing,
wherein each of the journal bearing pins comprises, along a length of the respective journal bearing, a stiffness which varies along a longitudinal axis of the journal bearing pin;
wherein the journal bearing pin comprises a wall with an inner surface, and further comprising at least one stiffening ring provided in the inner surface of the wall, wherein an inner radius of the pin is decreased in an area of the stiffening ring.

2. The planetary gearbox of claim 1, wherein the stiffness of the journal bearing pin varies along the longitudinal axis of the pin such that the stiffness is reduced in axial areas in which a radial deflection of the respective planet gear is maximal during operation.

3. The planetary gearbox of claim 1, wherein the stiffness of the journal bearing pin varies along the longitudinal axis of the pin such that at least one chosen from the following occurs: an oil film thickness of an oil film in the respective journal bearing is constant and an oil film pressure of the oil film in the respective journal bearing has one maximum only between ends of the journal bearing pin.

4. The planetary gearbox of claim 1, wherein the stiffness of the journal bearing pin additionally varies in a circumferential direction of the journal bearing pin at at least one axial position of the journal bearing pin.

5. The planetary gearbox of claim 1, wherein the journal bearing pin comprises the wall and an inner bore that extends along the longitudinal axis of the journal bearing pin.

6. The planetary gearbox of claim 5, wherein the stiffness of the journal bearing pin varies along the longitudinal axis due to a wall thickness of the journal bearing pin varying along the longitudinal axis, wherein the wall thickness is modulated by an inner bore geometry, wherein cutouts are provided in an inner surface of the wall, wherein an inner radius of the journal bearing pin is increased in the cutouts.

7. The planetary gearbox of claim 6, wherein the cutouts extend less than 360° in a circumferential direction.

8. The planetary gearbox of claim 6, wherein at least one of the cutouts is located between a middle and a forward end of the journal bearing pin and at least one of the cutouts is located between the middle and a rearward end of the journal bearing pin.

9. The planetary gearbox of claim 6, wherein the cutouts form a rectangular step in the inner surface of the wall.

10. The planetary gearbox of claim 6, wherein the cutouts extend less than 180° in a circumferential direction.

11. The planetary gearbox of claim 1, wherein the journal bearing pin comprises at least one stiffening rib that extends between circumferentially opposite wall sections of the journal bearing pin.

12. The planetary gearbox of claim 11, wherein the at least one stiffening rib extends cross to a longitudinal direction of the journal bearing pin.

13. The planetary gearbox of claim 11, wherein the at least one stiffening rib extends in a longitudinal direction of the journal bearing pin.

14. The planetary gearbox of claim 1, wherein the stiffness of the journal bearing pin has a maximum in a central area of the journal bearing pin and two minima in areas that are located between the central area and mounting ends of the journal bearing pin, wherein a respective one of the minima is not at the mounting ends but at a distance from the mounting ends of the journal bearing pin.

15. The planetary gearbox of claim 14, wherein, starting axially from one of the mounting ends, the stiffness first reduces in a first area, then increases to the maximum in the central area, then decreases in a second area and increases again at the other mounting end.

16. The planetary gearbox of claim 1, wherein the stiffness of the journal bearing pin varies along the longitudinal axis of the journal bearing pin due to material properties of the pin that define the stiffness of the journal bearing pin varying along the longitudinal axis.

17. A planetary gearbox comprising:
a sun gear configured to rotate about a rotational axis of the planetary gearbox, the rotational axis defining an axial direction of the planetary gearbox,
a plurality of planet gears which are driven by the sun gear, each planet gear comprising an inner bore,
a ring gear, the planet gears meshing with the ring gear, and
a plurality of journal bearing pins, each of the journal bearing pins being located respectively in the inner bore of one of the planet gears, the journal bearing pins each having a longitudinal axis which extends in the axial direction of the planetary gearbox,
each of the respective journal bearing pins and planet gears forming a journal bearing,
wherein each of the journal bearing pins comprises, along a length of the respective journal bearing, a stiffness which varies along a longitudinal axis of the journal bearing pin,
wherein the journal bearing pin comprises at least one stiffening rib that extends between circumferentially opposite wall sections of the journal bearing pin,
wherein the at least one stiffening rib extends in a longitudinal direction of the journal bearing pin.

18. A planetary gearbox comprising:
a sun gear configured to rotate about a rotational axis of the planetary gearbox, the rotational axis defining an axial direction of the planetary gearbox,
a plurality of planet gears which are driven by the sun gear, each planet gear comprising an inner bore,
a ring gear, the planet gears meshing with the ring gear, and
a plurality of journal bearing pins, each of the journal bearing pins being located respectively in the inner bore of one of the planet gears, the journal bearing pins each having a longitudinal axis which extends in the axial direction of the planetary gearbox,
each of the respective journal bearing pins and planet gears forming a journal bearing,
wherein each of the journal bearing pins comprises, along a length of the respective journal bearing, a stiffness which varies along a longitudinal axis of the journal bearing pin,
wherein the stiffness of the journal bearing pin has a maximum in a central area of the journal bearing pin and two minima in areas that are located between the central area and mounting ends of the journal bearing pin, wherein a respective one of the minima is not at the mounting ends but at a distance from the mounting ends of the journal bearing pin.

19. The planetary gearbox of claim 18, wherein, starting axially from one of the mounting ends, the stiffness first reduces in a first area, then increases to the maximum in the central area, then decreases in a second area and increases again at the other mounting end.

* * * * *